Patented Oct. 21, 1952

2,615,004

UNITED STATES PATENT OFFICE 2,615,004

MIXED DILUENT SYSTEM FOR COPOLYMERIZATION OF STYRENE AND ISOBUTYLENE

Gabriel E. Jasper, Plainfield, and Lester Marshall Welch, Madison, N. J., assignors to Standard Oil Development Company, a corporation of Delaware No Drawing. Application August 30, 1950, Serial No. 182,416

6 Claims. (Cl. 260—33.6)

This invention relates to lubricant additives and to a process for their preparation. Particularly the invention relates to a process for the preparation of a lubricant additive having the desirable characteristic of decreasing the rate of change of viscosity with temperature of lubricating oil with which it is blended. More particularly it relates to an improved process for the preparation of copolymers of styrene and isobutylene for use as viscosity index improvers.

Various polymeric substances have long been added to lubricating oils to improve their desirable characteristics. For example, the lubricating art is familiar with such substances as viscosity index improvers, added to lubricating oils to decrease the rate of change of the viscosity of the oil with temperature change, pour point depressors, added to lower the temperature at which waxy mineral lubricating oils solidify, detergents, corrosion inhibitors, oxidation inhibitors, oiliness agents, and the like. All of these substances are additive materials, and enhance or improve some characteristic of the oil that is desirable. It is with the first of the additive materials mentioned above, that is, viscosity index improvers, that this invention is concerned.

It is known in the lubricant additive art that specific polymers of styrene and other aliphatic unsaturated compounds such as olefins, and the like, have utility as lubricant additives. In U. S. Patent 2,274,749 issued March 3, 1942, to Smyers, it is disclosed that styrene and isobutylene may be copolymerized to form a copolymer that is useful for raising the viscosity index of lubricating oils. The use of these copolymers in lubricating oils has been curtailed, however, due to the formation of cloudy opaque solutions when the copolymer and the base oil, are blended together. It is believed that this opacity is due to insoluble high molecular weight copolymer which remains undissolved in the base oil blend.

Attempts have been made to correct this undesirable insolubility by reducing the molecular weight of the styreneisobutylene copolymer but when a reduction of molecular weight sufficient to give a clear polymer solution is attained, the viscosity index improvement is lowered and too great a quantity of the copolymer is needed to attain a desired viscosity index level.

It has been found that clear copolymer solutions in oil may be obtained when the copolymerization process occurs in the presence of specific ratios of monomer to diluent, provided that the reaction is executed within a specific temperature range. For example, under other specific conditions a copolymer that is completely soluble in the test oil can be obtained by copolymerizing monomers at a preferred temperature of about —44.5° C. using methyl chloride as a diluent. A ratio of the methyl chloride to monomer must be within a range of from 0.25 to 1 and 3.25 to 1. It is preferred, however, that the diluent-monomer ratio be 1.0 to 1 to 2.5 to 1. Using this technique the catalyst used may be any Friedel-Crafts catalyst in a suitable solvent although it is preferred to use $AlCl_3$ in methyl chloride. The conversion should be limited to less than 70%, preferably, between 50 and 65%. To illustrate this method of producing cloud-free copolymer oil solutions, the following examples are given:

Example I 60 g. of isobutylene and 90 g. of styrene are charged to a batch reactor containing 500 ml. of methyl chloride resulting in a diluent ratio 2.5 to 1. The reactor temperature was maintained at —44.5° C. by the use of an external refrigerant. The reactor ingredients were agitated and 121 ml. of aluminum chloride dissolved in methyl chloride (0.2 g. of $AlCl_3$ per 100 ml. of methyl chloride) were added to the reactor intermittently over a 7 minute period. At the end of this period the reaction was quenched with methanol and the copolymer recovered in the conventional manner. Conversion was 52.4% and the molecular weight of the product was 12,000 Staudinger. Using as a test oil a Mid-Continent petroleum distillate having a viscosity at 210° F. of 37.2 S. U. S. and a viscosity index of 90.1 a blend was prepared containing 5% of this copolymer. The blend has a viscosity at 210 of 52 S. U. S. and a viscosity index of 154, and was water clear, containing no visible haze or cloud.

Example II

In order to illustrate the effect of the diluent ratio the following runs were made at —44.5° C.

(a) 650 c. c. of methyl chloride, 60 g. of isobutylene and 90 g. of styrene (3.25:1 diluent ratio) were charged to a batch reactor and copolymerized in the manner described in Example I. Conversion was limited to 46.4%. This copolymer had a molecular weight of 8500 Staudinger and a 3% solution in the test oil was very hazy.

(b) 200 c. c. of methyl chloride, 260 g. of isobutylene and 390 g. of styrene (0.24 to 1 diluent ratio) were copolymerized in a batch reactor in the manner described in Example I. The conversion was limited to 39.7%. A 3% solution of this copolymer (7,000 Staudinger) in the test oil was also very hazy.

The technique outlined in detail above while capable of producing cloud-free oil solutions of copolymers of isobutylene and styrene has the disadvantage that a very specific temperature range must be used during the copolymerization step. This restriction is limiting as concerning plant production and is undesirable.

It has now been discovered, and forms the primary object of this invention, that a copolymer of styrene and isobutylene having outstanding viscosity index improving potency and giving a clear solution when blended with a lubricating oil may be obtained by carrying out the copolymerization reaction in a mixed diluent system and at the same time controlling the reaction so as to give a conversion level of between 30 and 60%. By this improved process a copolymer of styrene and isobutylene having a molecular weight sufficiently high to furnish the desirable viscosity index level with small concentrations may be prepared at a temperature range technically operable in large scale plant production and thus is an improvement on the method detailed in Examples I and II.

The amounts of styrene and isobutylene used in the preparation of the copolymer will depend upon the characteristics desired in the final product. Ordinarily it is desired in preparing the viscosity index improvers of this invention to copolymerize a mixture of styrene and isobutylene that contains from about 0.77 to 1.63 mols of styrene per mol of isobutylene. A very desirable product may be obtained using equimolar proportions of the monomers.

As the mixed diluent for the copolymerization reaction it is desired to use a mixture of an inert hydrocarbon solvent containing from 2 to 6 carbon atoms, such as liquid propane or butane, and a halogenated hydrocarbon of from 1 to 4 carbon atoms, the chlorides such as methyl chloride, ethyl chloride and the like being preferred. The mixture may be composed of from about 3 to 8 parts of the hydrocarbon solvent per part of the halogenated hydrocarbon. In the preferred embodiment of the invention the mixture contains from about 6 to 7 parts of the solvent such as propane per part of the halogenated hydrocarbon, such as methyl chloride.

The ratio of the mixed diluent to monomers used in the preparation of the copolymer is variable and depends upon the temperature of copolymerization, monomer composition, and diluent composition. From about 2 to 6 parts by volume of the mixed diluent may be used. In the preferred embodiment of the invention the reactor charge consists of from 3 to 4.5 parts of mixed diluent per part of monomers. In all instances, "parts" refers to "parts by volume."

The temperature at which the copolymerization reaction is carried out will depend, to some extent, upon the final molecular weight desired. Temperatures within a range of from $-100°$ C. to $-30°$ C. are operable with $-90°$ C. to $-50°$ C. being preferred.

The molecular weight of the copolymer product influences its thickening power, or its viscosity index improving potency. It is desirable to maintain molecular weight as high as is consistent with good shear stability and clarity of solutions of the copolymer in oil. The molecular weight of the copolymer may vary between about 10,000 and 30,000 Staudinger, a preferable range being 15,000 to 25,000.

As catalyst for the reaction, $BF_3$ is preferred and is utilized in the preferred embodiment, although other Friedel-Crafts catalysts known to the art may be employed.

An important feature of the improved process of this invention is the control of the conversion level. The conversion level, or the weight percent of monomers that are polymerized, is preferably maintained at one between 35% and 55% conversion, with one from 30% to 60% being operable under some conditions. The conversion level may be controlled in a variety of manners, the most simple being to stop the catalyst addition when the desired conversion level has been attained. Other means of controlling conversion include quenching the reaction by the addition of low molecular weight aliphatic alcohols such as methanol.

In order to specifically illustrate the invention described in general terms above the following examples are given.

Example III 60 g. of isobutylene and 90 g. of styrene were charged to a reactor containing 500 ml. of methyl chloride alone. 92 ml. of a methyl chloride solution of $AlCl_3$ (0.2 g. per 100 ml.) was added to the reactor while the reactor contents were maintained at $-78.5°$ C. The conversion was limited to 40% and the copolymer was purified by precipitating the polymer in methanol and drying on a hot mill. The molecular weight of this copolymer was 16,000 Staudinger.

Using as a test oil a Mid-Continent petroleum distillate having a viscosity at 210° F. of 37.2 S. U. S. and a viscosity index of 90.6, sufficient of the copolymer was added so as to make up a blend containing 6% of the copolymer. This blend was very cloudy and entirely unsuited for commercial sale. Filtration was not effective in removing the cloudiness.

Example IV

A mixture of 60 g. of isobutylene and 90 g. of styrene were charged to a batch reactor which contained a mixture of 700 ml. of liquid propane and 100 ml. of methyl chloride as a diluent. To the reactor was then charged 398 ml. of a solution of $BF_3$ in methyl chloride, the strength of the solution being 0.1 g. of $BF_3$ per 100 ml. of methyl chloride. The temperature of copolymerization was maintained at $-78.5°$ C. Conversion was limited to 38.1% by quenching with an excess of methanol after 23 minutes reaction time and the copolymer was recovered as in Example III. The molecular weight of the recovered copolymer was 18,000 Staudinger.

Using as a test oil a Mid-Continent petroleum distillate having a viscosity at 210° F. of 37.2 S. U. S. and a viscosity index of 90.6, the same oil as in Example III, sufficient of the copolymer was added so as to make up a 3.3 weight percent blend of the copolymer in the oil. The resulting blend had a viscosity at 210° F. of 55 S. U. S. and a viscosity index of 152. Additional copolymer was added until a 6% blend of the copolymer in oil was obtained. This 6% solution was perfectly clear and had no cloudiness or opacity whatsoever.

Example V

To investigate the effect of diluent type the following experiment was carried out.

60 g. of isobutylene and 90 g. of styrene were charged to a batch reactor containing 800 ml. of methyl chloride, the same volume of diluent as in Example IV but limited to methyl chloride. While the reactor was maintained at $-78.5°$ C. there was added 381 c. c. of methyl chloride solution of $AlCl_3$ (0.1 g. of $AlCl_3$ per 100 ml. of methyl chloride). The conversion was limited to 51% and the purified product had a molecular weight of 15,500 Staudinger.

Using the same test oil as in the two examples above a 6% solution of the copolymer in the test oil was prepared. This solution was also very cloudy and entirely unsatisfactory.

*Example VI*

The substitution of $BF_3$ for $AlCl_3$ as catalyst failed to improve the clarity in a run identical to Example V. The improvement in clarity is therefore attributed to the mixed hydrocarbon alkyl halide diluent.

Although the foregoing embodiment recites the batchwise preparation of the product, one advantage of the mixed diluent technique lies in its adaptability to a continuous process. In this process the reactants with catalyst and diluent are fed continuously into a reaction vessel and the product is continuously removed.

A second advantage is found in the preparation of the oil solution of the product. The reaction mixture, after the reaction has been stopped, may be introduced directly into the base oil to be modified and the diluents, used catalyst, and unreacted monomers removed therefrom.

What is claimed is:

1. A process for the preparation of substantially completely mineral oil soluble styrene-isobutylene copolymers having molecular weights within a range of from about 10,000 to 30,000 Staudinger which comprises copolymerizing a mixture of styrene and isobutylene containing about 0.77 to 1.63 mols of styrene per mol of isobutylene in the presence of a solution of a Friedel-Crafts catalyst at a temperature between about $-100°$ C. to $-30°$ C. and in the presence of about 2 to 6 volumes of a mixed diluent, said mixture consisting of about 3 to 8 parts by volume of an inert aliphatic hydrocarbon solvent containing from 2 to 6 carbon atoms per molecule and about 1 part by volume of a chlorinated aliphatic hydrocarbon containing from 1 to 4 carbon atoms per molecule, maintaining a conversion level between 30% and 60% and recovering the product therefrom.

2. A process of preparing a substantially completely mineral oil soluble copolymer of styrene and isobutylene having a molecular weight of about 10,000 to 30,000 Staudinger which comprises copolymerizing a mixture of styrene and isobutylene containing from about 0.77 to 1.63 mols of styrene with 1 mol of isobutylene in the presence of a solution of a Friedel-Crafts catalyst at a temperature within a range of from $-100°$ C. to $-30°$ C. and in the presence of about 2 to 6 parts by volume of a mixture of from 3 to 8 parts of an inert aliphatic hydrocarbon solvent having from 2 to 6 carbon atoms per molecule per part of a chlorinated aliphatic hydrocarbon containing from 1 to 4 carbon atoms per molecule, maintaining a conversion level at one between 30% and 60%, admixing the crude reaction product with a mineral lubricating oil, removing unreacted monomers, diluent and catalyst therefrom and obtaining a mineral oil solution of the desired copolymer product.

3. A process for the preparation of substantially completely mineral oil soluble copolymers of styrene and isobutylene having an average molecular weight of about 15,000 to 25,000 which comprises copolymerizing about equimolar proportions of styrene and isobutylene in the presence of a solution of a Friedel-Crafts catalyst at a temperature within a range of from about $-90°$ C. to $-50°$ C. and in the presence of 2 to 6 parts by volume of a mixed diluent consisting of an inert aliphatic hydrocarbon solvent containing from 2 to 6 carbon atoms per molecule in a chlorinated aliphatic hydrocarbon containing from 1 to 4 carbon atoms per molecule, said mixed diluent containing from 3 to 8 parts of an inert hydrocarbon, maintaining a conversion level between 35% and 55% and recovering the desired copolymer product.

4. A process according to claim 3 wherein the crude reaction product is admixed with a mineral oil and unreacted monomers, mixed diluent and catalyst is removed leaving an oil solution of the desired copolymer product.

5. A process for the preparation of substantially completely mineral oil soluble copolymers of styrene and isobutylene having a molecular weight within a range of from 15,000 to 25,000 which comprises copolymerizing about equimolar proportions of styrene and isobutylene in the presence of a methyl chloride solution of $BF_3$ as a catalyst at a temperature of within a range of from $-90°$ C. to $-50°$ C. in the presence of from 3 to 4.5 parts by volume of a mixed diluent consisting of from 6 to 7 parts of propane per part of methyl chloride, stopping the reaction when the conversion level of between 35% and 55% is obtained and recovering the desired copolymer product.

6. A process according to claim 5 wherein the quenched reaction mixture is admixed with a mineral oil, the unreacted monomers, the mixed diluent and the catalyst are removed and a mineral oil solution of the desired copolymer product obtained.

GABRIEL E. JASPER.
LESTER MARSHALL WELCH.

REFERENCES CITED

The following references are of record in the file of this patent:

UNITED STATES PATENTS

| Number | Name | Date |
|---|---|---|
| 2,478,843 | Seymour | Aug. 9, 1949 |
| 2,491,525 | Sparks et al. | Dec. 20, 1949 |